(12) United States Patent
Wagner-Stuerz

(10) Patent No.: US 10,711,810 B2
(45) Date of Patent: Jul. 14, 2020

(54) CLOSED LOOP AND/OR OPEN LOOP CONTROL METHOD FOR AN ELECTROPNEUMATIC FIELD DEVICE

(71) Applicant: SAMSON AKTIENGESELLSCHAFT, Frankfurt (DE)

(72) Inventor: David Wagner-Stuerz, Muehltal (DE)

(73) Assignee: SAMSON AKTIENGESELLSCHAFT, Frankfurt (DE)

(*) Notice: Subject to any disclaimer, the term of this patent is extended or adjusted under 35 U.S.C. 154(b) by 280 days.

(21) Appl. No.: 15/852,579

(22) Filed: Dec. 22, 2017

(65) Prior Publication Data

US 2018/0180069 A1 Jun. 28, 2018

(30) Foreign Application Priority Data

Dec. 23, 2016 (DE) .................. 10 2016 125 643

(51) Int. Cl.

| F15B 13/043 | (2006.01) |
|---|---|
| G05B 19/042 | (2006.01) |
| G05B 9/02 | (2006.01) |
| F15B 5/00 | (2006.01) |

(Continued)

(52) U.S. Cl.
CPC .......... *F15B 13/0433* (2013.01); *F15B 5/006* (2013.01); *F15B 13/0435* (2013.01); *F15B 13/0436* (2013.01); *F15B 21/08* (2013.01); *G05B 9/02* (2013.01); *G05B 19/042* (2013.01); *F15B 2013/0428* (2013.01);

(Continued)

(58) Field of Classification Search
CPC ................................................. F15B 13/043
See application file for complete search history.

(56) References Cited

U.S. PATENT DOCUMENTS

| 5,549,137 A * | 8/1996 | Lenz ............... G05D 7/005 |
|---|---|---|
| | | 137/486 |
| 6,512,960 B1 | 1/2003 | Schulz |
| 7,802,585 B2 | 9/2010 | Kolbenschlag |

(Continued)

FOREIGN PATENT DOCUMENTS

| DE | 19505233 C2 | 5/1999 |
|---|---|---|
| DE | 19921828 A1 | 11/2000 |

(Continued)

OTHER PUBLICATIONS

German Office Action dated Oct. 17, 2017 for application 10 2016 125 643.9.

*Primary Examiner* — Tejal Gami
(74) *Attorney, Agent, or Firm* — Schiff Hardin LLP (57) ABSTRACT

In a closed loop control method for an electropneumatic field device, an electronic target value input of a command variable corresponding to a target value of a control center is received by the open loop and/or closed loop control electronics, an electronic output for a manipulating variable to pilot the electropneumatic converter is generated by the open loop and/or closed loop control electronics; and, in a predetermined operating condition of the field device, the manipulating variable is determined by a closed loop control algorithm based on the command variable and on another controlled variable different from an actual control member position measurement value.

16 Claims, 6 Drawing Sheets

(51) Int. Cl.
  *F15B 21/08*   (2006.01)
  *F15B 13/042*  (2006.01)
(52) U.S. Cl.
  CPC ............. *F15B 2211/30565* (2013.01); *F15B 2211/6653* (2013.01); *F15B 2211/6656* (2013.01)

(56) References Cited

U.S. PATENT DOCUMENTS

| | | |
|---|---|---|
| 8,282,071 B2 | 10/2012 | Tabelander et al. |
| 8,528,583 B2 | 9/2013 | Kolbenschlag |
| 2010/0036542 A1 | 2/2010 | Karte |
| 2017/0204885 A1 | 7/2017 | Valentin-Rumpel |

FOREIGN PATENT DOCUMENTS

| | | |
|---|---|---|
| DE | 102006006585 B3 | 10/2007 |
| DE | 102007062207 A1 | 6/2009 |
| DE | 102008037108 A1 | 2/2010 |
| DE | 102008038723 B3 | 4/2010 |
| DE | 102016100919 B3 | 5/2017 |
| EP | 3196483 A1 | 7/2017 |

* cited by examiner

CLOSED LOOP AND/OR OPEN LOOP CONTROL METHOD FOR AN ELECTROPNEUMATIC FIELD DEVICE

CROSS REFERENCE TO RELATED APPLICATIONS

This patent application claims priority to German Patent Application No. 102016125643.9, filed Dec. 23, 2016, which is incorporated herein by reference in its entirety.

BACKGROUND

The disclosure relates to an open loop and/or closed loop control method for an electropneumatic field device of a processing plant, such as a chemical plant, for example a petrochemical plant, a food-processing plant, for example a brewery, a power station or the like. An electropneumatic field devices can include a pneumatic actuating drive for operating a control member, such as a control valve, an electropneumatic converter for generating a pneumatic manipulating variable signal for the pneumatic actuating drive and open loop and/or closed loop control electronics with an electrical target value input for a command variable of a superordinate closed loop control system, for example from a control centre, for predetermining a target value, and an electrical output for a manipulating variable for piloting the electropneumatic converter. The pneumatic actuating drive can for example be connected to a valve member of a control valve, for example by an actuating rod for transmitting a translational actuating movement, or, if it is a rotary actuating drive, by an actuating shaft for transmitting a rotary actuating movement. An electropneumatic converter for generating a pneumatic control signal can for example provide an actuating pressure of 1 bar to 20 bar, for example, particularly 1 bar to 6 bar or 1 bar to 10 bar, for a pneumatic drive chamber of a pneumatic actuating drive. Pneumatic actuating drives can for example be equipped in a single-acting manner with spring return or a double-acting manner with two pneumatic working chambers acting counter to one another.

A method for operating a position regulator and a position regulator applying this method are described in DE 199 21 828 A1. For example, the position regulator has a first input for a command variable W for predetermining a target value, a second input for a controlled variable X and an output for a manipulating variable Y. The position regulator further comprises a closed loop controller, which generates a first output signal for forming the manipulating variable Y as a function of the input variable W and the controlled variable X. The position regulator has an error detector which detects whether the controlled variable X has assumed an incorrect operational state and which generates an error signal in the event of such an incorrect operational state. The error signal acts on a switch, which can deactivate the closed loop controller and activate an open loop controller. The open loop controller can be provided to provide a second output signal, assigned to an input variable W, for forming a manipulating variable Y. Thus, the open loop controller generates an output signal, which can be dependent on the input variable, for example linearly. The dependence of the output signal on a controlled variable can be determined during an initialization of the position regulator on the basis of the determination of a relationship between a manipulating variable and the input variable, which can be stored in a memory of the open loop controller.

DE 199 21 828 A1 describes that the controlled variable X is for example a position signal detected by a travel sensor of an actuating rod of a pneumatic actuating drive, which position signal is particularly prone to error as a consequence of the usual wear in typical travel sensors, which are realized as conductive plastics. In the event of an incorrect operational state of the measured position variable or controlled variable X, the known position regulator nevertheless ensures a still constantly reliable operating mode. The position regulator according to DE 199 21 828 A1 is suitable, in slowly changing processes and processes with only small disturbances, for setting the signal of the manipulating variable in such a manner that the actual valve position can always be kept close to its target value. This increases the operational reliability of a processing plant, which is equipped with such a position regulator, and avoids, as was previously necessary, having to immediately cause a position regulator to bring the control valve into a safe emergency off condition in the event of failure of the signal of the controlled variable. For moderately fast to fast changing processes, or processes with considerable disturbances, this position regulator is only suitable to a limited extent.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure is directed to an open loop and/or closed loop control method, which allows an improved emergency actuation of a pneumatic actuating drive in the event of failure of a controlled variable.

Accordingly, a closed loop control method is provided for an electropneumatic field device. The electropneumatic field device can include an electropneumatic actuating drive for actuating a control member, such as a control valve, an electropneumatic converter for generating a pneumatic manipulating variable signal for the pneumatic actuating drive and open loop and/or closed loop control electronics with an electrical target value input for a command variable for predetermining a target value, particularly of a command value, and with an electrical output for a manipulating variable for piloting the electropneumatic converter. The electropneumatic field device can be provided for setting a process fluid stream of a processing plant, for example a chemical plant, such as a petrochemical plant, a food-processing plant, such as a brewery, a power station or the like. In particular, translational or rotary control valves with a corresponding actuating drive is considered as control members. The actuating drive can transmit a movement to the control member via an actuating rod or actuating shaft. In particular, an I/P converter can be considered as an electropneumatic converter, which I/P converter can provide an output pressure of between 1 bar and 6 bar, for example as a function of an input current and a supply pressure of for example 10 bar. An electropneumatic converter may comprise a pilot valve and a pneumatic booster, in order to be able to provide an increased volumetric flow. Open loop and/or closed loop control electronics can be realized in a digital or analogue manner or in a mixed design. The command variable, which may in particular originate from a control centre of the processing plant, can for example be a 4-20 mA signal or the like. A pulse-width-modulated current or voltage signal or a 4-20 mA signal can for example be provided as manipulating variables for piloting an electropneumatic converter. The manipulating variable for piloting the electropneumatic converter is transferred from the open loop control and/or closed loop control electronics to the electropneumatic converter via a communication connection.

In the closed loop control method according to the disclosure, the manipulating variable is determined in a predetermined operating condition of the field device, such as an emergency closed loop control operating condition, by means of a closed loop control algorithm on the basis of the command variable and another controlled variable different from the actual measurement value of the control member position. In processing plants or electropneumatic field devices, different actual measurement values are often detected, particularly in the region of the field device. It has been established that an emergency closed loop control is to be preferred to a mere emergency open loop control in the event of a total failure of the controller, as a considerably higher closed loop control quality can be achieved than with a mere open loop control without feedback.

The inventors have found that in the event of a failure of an actual measurement value of a position, other measurement values can be used as controlled variables in its place, in order to determine the manipulating variable using a closed loop control algorithm. The use of another actual measurement value different from the actual measurement value of the control member position as the controlled variable makes it possible for the closed loop control method according to the disclosure to nonetheless undertake a closed loop control on the basis of a target value (the command variable)/actual value (the other controlled variable) comparison, irrespective of a failure of the actual measurement value of the position of the control member, and to carry out a stable closed loop control on the basis thereof. A P closed loop control, a PI closed loop control, a PID closed loop control, a PD closed loop control or the like can be considered as the closed loop control algorithms.

According to an exemplary embodiment of the disclosure, in the predetermined operating condition, such as the emergency closed loop control condition, the manipulating variable is determined by means of a closed loop control algorithm based on the command variable and an actuating-pressure related controlled variable and/or an actuating-force related controlled variable. Actual measurement values, which relate to the actuating pressure or the pneumatic fluid for providing the actuating pressure at the pneumatic actuating drive, can be used as actuating-pressure related controlled variable. For example, an actuating-pressure related controlled variable may be an actual measurement value for the actuating pressure detected in the actuating drive. An actuating-pressure related controlled variable may also be an actual measurement value for the actuating pressure detected by the pneumatic actuating drive in the supply line of the pneumatic actuating drive. Furthermore, an actuating-pressure related controlled variable can for example be the actual measurement value for the actuating pressure measured at the output of an electropneumatic converter, particularly of a solenoid valve or pilot valve. If the electropneumatic converter comprises a booster, such as a pneumatic booster, the actual measurement value for the actuating pressure at the input or at the output of this pneumatic booster can be used as actuating-pressure related controlled variable. In the case of a pneumatic booster, which has a position detection with regards to the booster plunger, an actual position measurement value regarding the position of a plunger of a pneumatic booster can also be used as actuating pressure-related controlled variable.

Alternatively or additionally to an actuating-pressure-related control variable, an actuating-force related controlled variable can be provided to the closed loop control algorithm in the predetermined operating condition, such as the emergency closed loop control condition. An actuating-force-related controlled variable is an actual measurement value, which relates to the force transmission between the actuating drive and the control member. It shall be clear that the term force generally also includes torques in the present case. An actual measurement value of the stress and/or elongation of a return spring of the pneumatic actuating drive can for example be used as actuating-force-related controlled variable, if the pneumatic actuating drive is a single-acting pneumatic drive with a return spring. An actual measurement value of the stress and/or strain (elongation) of a drive rod or shaft of the pneumatic actuating drive can be used as actuating-force-related controlled variable. Regardless of whether the closed loop control algorithm in the predetermined operating condition is based, apart from the command value, on an actuating-pressure related controlled variable related controlled variable, an actuating-force related controlled variable or both an actuating-pressure- and an actuating-force-related controlled variable, it is ensured that in the predetermined operating condition of the field device, a closed loop is realized, which allows an indirect closed loop control for setting the control member, even though no actual measurement value of the control member position is detected. It has been established that such an indirect closed loop control by means of a different controlled variable than the original controlled variable, the actual measurement value of the control member position, makes it possible, even in the event of a failure of a position sensor system, to provide a high-quality closed-loop-control quality. Particularly in the case of safety-critical processing plants or processing plants, in which the failure of a field device may lead to considerable economic losses, for example in the food industry, when raw materials may spoil on a large scale if a process fails, it has proven to be very advantageous to be able to have recourse to a secondary controlled variable in the event of failure of the primary controlled variable.

According to another exemplary embodiment of the disclosure, which can be combined with the previous embodiment, in the predetermined operating condition, the manipulating variable is determined by means of a closed loop control algorithm based on the command variable and a process-fluid-related controlled variable. An upstream pressure and/or downstream pressure in relation to the control member, a process fluid stream velocity, particularly upstream and/or downstream of the control member, or a noise at the control member can for example be used as the process-fluid-related controlled variable. In particular, a cavitation noise on the control member in particular can be used as an indicator for an opening position or an actual flow rate, which can be used indirectly as a basis for a closed loop control of the control member positioning.

Conventional closed loop algorithms are based on a target value/actual value comparison of a single command variable with a single controlled variable. It may be advantageous, in the event of the failure of a primary controlled variable, to use a plurality of secondary controlled variables in place thereof, as the actual value basis of a target value/actual value comparison compared to a target value command variable. Actuating-pressure-related controlled variables and/or actuating-force-related controlled variables generally realize influencing factors on the primary control member position value controlled variable. A process-fluid-related controlled variable is generally a variable influenced by the primary control member position value controlled value. For a precise closed loop control in the predetermined operating condition, such as an emergency closed loop control condition, it may be advantageous to take into account both an influencing variable, such as an actuating-force- and/or actuating pressure-related controlled variable and an influenced variable, such as a process-fluid-related controlled variable. In this manner, the actuating drive can be piloted by means of the open-loop control and/or closed-loop control electronics on the basis of controlled variables or actual measurement values, in order to ensure a very precise, albeit indirect closed-loop control of the actual control member position.

According to an exemplary embodiment of the disclosure, which can be combined with the previous embodiments, a series of predetermined controlled-variable measurement values, particularly a series of actuating-pressure related, actuating-force related or process-fluid related controlled variables, are assigned to one respective control member position measurement value. The assignment can take place in a normal operating condition, in which the actual measurement value of the position of the control member is detected correctly. For example, the assignment of controlled variable measurement values to one detected actual measurement value of the position of the control member in each case can take place during an initialization phase, for example during the first activation of the electropneumatic field device. In the predetermined operating condition, for example the emergency closed loop condition, dependent on the actual measurement values of the controlled variables, detected by means of a sensor of the field device, the previously assigned control member position measurement value is provided, in place of the control member position measurement value, to a closed loop control algorithm configured to determine the manipulating variable on the basis of the command variable and the actual control member position measurement value. In this case, the actually detected actual controlled-variable measurement value of a different controlled variable than a control member position is translated into a previously determined simulated control member position value assigned to the actual controlled-variable measurement value. For regulating purposes, the other controlled variable is therefore translated into a control member position measurement value previously determined as corresponding and therefore assigned, which is then provided as simulated actual position value to the closed-loop algorithm. The closed loop algorithm will determine the manipulating variable, taking account of the command variable. An emergency closed loop control of this type can be advantageous in cases in which there is a reliable correlation between control member position measurement value and measurement value of a different controlled variable. This offers the advantage, that the same closed loop control algorithm that is used during normal operation of the field device can also be used unchanged in the predetermined operating condition, for example an emergency operating condition.

In an exemplary embodiment of the disclosure, the series of predetermined controlled variable measurement values is assigned to one control member position measurement value in each case as a characteristic curve, characteristic valve function, value family, correlation function or the like. On the basis of a characteristic valve function, such as a correlation function, which can be defined for example during the initialization of the controller, the open loop control and/or closed loop control electronics can, in the predetermined operating condition, undertake a simple mathematical operation for translating or converting an actual controlled variable measurement value into a simulated control member position value, which is to be used as a basis for the closed loop control algorithm and which is assigned to the actual controlled variable measurement value. On the basis of a value family, the measured actual controlled variable measurement value can be assigned approximatively (to a closest) or iteratively (for example as an average value between two closest) control member position measurement values.

According to an exemplary embodiment of the disclosure, which can be combined with the previous embodiments, an assignment of control member position measurement values to the series of predetermined controlled variable measurement values can be updated, for example during the initialization process of the field device and/or in particular during the operation of the field device, preferably repeatedly during a predetermined time period. In an exemplary embodiment, the assignment is defined definitively during an initialization process of the field device. Subsequent updates during the operation of the field device can be used to check whether the assignment undertaken in the current actual operating condition continues to be correct. If appropriate, they can take account for changes caused by wear. In the case of repeated assignment, assignment averaging can be carried out in particular. Each individual assignment can either be used as the basis of averaging, wherein the averaging can be undertaken on the basis of weighting, in which a higher weighting can be apportioned to the assignment defined during initialization in particular than the assignments undertaken subsequently.

According to an exemplary embodiment of the disclosure, the position measurement value related to the pneumatic booster plunger is used as the other controlled variable. In this example, a reference variable, particularly a threshold value, is also predefined. One value in particular is considered as a reference variable, which value lies in the middle of the range of the command variable to be expected, particularly the average value of possible command variables. If the command variable is a 4-20 mA signal, the reference variable can for example be predefined as 12 mA. An emergency closed loop control is provided in that the reference variable is defined to correspond to approximately 50% of the command variable to be expected, an emergency closed loop control, is provided having essentially the same adjustment range for ventilation and exhausting during piloting is provided by means of the superimposed closed loop, for example starting from the control centre. Other reference variables, for example 8 mA and/or 16 mA, which limit the lower quarter or the upper quarter of the command variable to be expected, can likewise be defined as reference variable. In an exemplary embodiment of the closed loop control method, the manipulating variable is set in such a manner that the pneumatic booster plunger moves in the direction of 0% pneumatic booster opening, if the command variable is smaller than the reference variable. The manipulating variable can be set in such a manner that the pneumatic booster plunger moves in the direction of 100% opening, if the command variable is greater than the reference variable. Alternatively or additionally, the manipulating variable can be set in such a manner that the pneumatic booster plunger stands still if the command variable corresponds or at least substantially corresponds to the reference variable. It is absolutely conceivable that a tolerance band of for example ±1% or ±2% is provided around the reference variable, in order to stabilize the emergency closed loop control. A pneumatic volumetric flow booster has an adjustable $K_{VS}$ value, where in the predetermined operating condition (e.g. emergency operation condition), the $K_{VS}$ is reduced compared to normal operation. A reduced $K_{VS}$ value leads to an increased method stability. The $K_{VS}$ is determined for a supply pressure of 10 bar and an actuating pressure of 2.4 bar on the basis of the measurable air flow Q through the volumetric flow booster with the formula: $Q=K_{VS}*36.22$ m$^3$/h.

It shall be clear that for a field device, different operating conditions can be predetermined for the closed loop control method according to the disclosure, particularly different emergency closed loop control conditions. For example, a first emergency closed loop control operating condition for a closed loop control can be predefined on the basis of an actuating-pressure-specific controlled variable, a second emergency operating condition for a closed loop control can be predefined for controlling with the aid of an actuating-force specific controlled variable, and a third predetermined emergency operating condition for a closed loop control can be predefined on the basis of a process-fluid-specific controlled variable. Predetermined operating conditions, particularly emergency closed loop operating conditions, which are predetermined in that a combination of a plurality of controlled variables differing from the actual control member position measurement value are taken into account, are also conceivable.

The disclosure further relates to an open loop control method for an electropneumatic field device; comprising a pneumatic actuating drive for actuating a control member, such as a control valve, an electropneumatic converter for generating an electropneumatic manipulating variable signal for the pneumatic actuating drive and open loop and/or closed loop control electronics with an electrical target value input for a command variable for predetermining a target value, particularly of a command centre, and an electrical output for a manipulating variable for piloting the electropneumatic converter.

In the open loop control method according to the disclosure, in an predetermined operating condition of the field device, such as an emergency open loop control condition, the manipulating variable is determined by means of an open loop control algorithm based on the command variable and a predetermined reference variable, such as a tolerance range or a threshold value, wherein, depending on a comparison of the command variable with the reference variable, the manipulating variable is assigned to one of a plurality of predefined manipulating variable values. For example, three manipulating variable values can be predetermined. One (first) predetermined manipulating variable value can be predetermined such that it causes the electropneumatic converter to quickly or slowly exhaust the pneumatic drive. One (second) predetermined manipulating variable value can be predetermined such that it causes the electropneumatic converter to quickly or slowly ventilate the pneumatic actuating drive, particularly at a high actuating pressure with respect to the pressure available from a compressed air source. One further (third) predetermined manipulating variable value can be predetermined such that it causes the electropneumatic converter to output an actuating pressure to the pneumatic drive which lies in the central range of the supply pressure, for example at approximately 3.5 bar for a supply pressure of at most 6 bar. A manipulating variable value can also be predetermined in such a manner that it causes the electropneumatic converter to output an actuating pressure, which causes the control member to assume an open, particularly a slightly open position (1% to 10% flow volume) or a moderately open position (15% to 40% flow volume). For example, for a single-acting actuating drive with spring return, a manipulating variable value can be predetermined in that it is determined arithmetically which actuating pressure, i.e.: which actuating-pressure force of the return springs, is associated with which compression of the pneumatic drive. The predetermination of at least one of the plurality of predetermined actuating pressure values can also be undertaken during an initialization of the field device. For example, the controller can be moved once or multiple times between a completely closed and a completely open condition, and one respective manipulating variable value for achieving the completely closed condition or for achieving the completely open condition can be stored. A further manipulating variable value can be determined in the context of an initialization, for example from the mean values of the predetermined manipulating variable values for a completely open and the completely closed control member condition or correlating to a desired 50% open position.

A particularly simple emergency open loop control, which open loop control is particularly less prone to errors as a result, can be realized by storing a finite number of predetermined manipulating variable values. This may in particular be advantageous for safety-critical applications.

In an exemplary embodiment of an open loop control method, in the predetermined operating condition, particularly the emergency open loop control condition, a first predetermined manipulating variable value is assigned to the manipulating variable, in the event that the command variable is smaller than the reference variable, and/or the a second predetermined manipulating variable value is assigned to the manipulating variable, in the event that the command variable is greater than the reference variable, and/or a third predetermined manipulating variable value is assigned to the manipulating variable, in the event that the command variable corresponds to the reference variable. The manipulating variable values can for example be predetermined in such a manner that the first predetermined manipulating variable value causes the electropneumatic converter to output a pressure signal, which causes the pneumatic actuating drive to close the control member. The second manipulating variable value could be predetermined such that it causes the pneumatic actuating drive to move in the direction of the open position. The third predetermined manipulating variable can be predetermined in such a manner that it causes the electropneumatic converter to output a pressure signal, which causes the position of the control member remains unchanged or travel to a certain position, for example for throttling the process fluid.

In an exemplary embodiment of an open loop control method, the first predetermined manipulating variable value is determined in such a manner that the first manipulating variable value causes the electropneumatic converter to reduce the output pressure. The second predetermined manipulating variable value can be predetermined in such a manner that, using the second manipulating variable value, the electropneumatic converter is caused to increase the output pressure. A third predetermined manipulating variable value can be predetermined such that the third manipulating variable value allows the electropneumatic converter to set a predetermined, particularly mean, output pressure.

The manipulating variable values can for example be predetermined in such a manner that the control member can be moved in its working range between a completely closed (0%) position and a completely open (100%) position. In the open loop control method according to the disclosure, predetermined manipulating variable values can be assigned to a plurality of desired (target) control member positions (for example 0%, 50%, 100% or 10%, 20%, 30%, . . . 90%, 100%), which manipulating variable values, according to experience, for example determined in an initialization run or an update run, cause the electropneumatic converter to output an actuating pressure, which causes the control member to approximately assume the desired position.

In an exemplary embodiment of an open loop control method, a comparison of the command variable with a reference variable is undertaken, particularly a threshold value, which corresponds for example to 50% of the command variable to be expected. For a command variable, which moves between 4 and 20 mA, the reference value can be defined as 12 mA. If it is determined that the command variable corresponds to the reference variable, the open loop control routine causes an output of a manipulating variable signal of an electropneumatic converter, which causes the electropneumatic converter to output an actuating pressure to the pneumatic drive, which moves the control member into the centre (50% position) of a permitted range of control member movement. If it is determined on the basis of the comparison with this reference value, that the command variable is smaller than the reference variable, a command-value-dependent open loop control can take place on the basis of a characteristic curve for example, which open loop control causes movement of the control member in the direction of the closed position. In this case, for the range of 10% to 49%, a linear assignment of the command value to a manipulating variable can take place, which causes the 10% to 49% position of the control member corresponding to the command value. For the range for example below a closing range threshold value of for example 10%, the open loop control method according to the disclosure can provide a different characteristic curve for the assignment of command values to manipulating variables, in order to ensure a closed position for example already at a 5% command variable value or a 2% command variable value.

In the event that the comparison of the command variable with the reference value results on the other hand in the command variable being greater than the reference value, a linear (or progressive) opening of the control valve can for example take place using a characteristic curve in accordance with the predetermined command value, so that for example in the case of a 60% command variable, a 60% opening is realized and in the case of an 80% command variable, an 80% (or wider) opening position is realized. A second threshold value, such as a full-opening range threshold value, may be provided for example at 90% in relation to the command variable to be expected, above which threshold value a different characteristic curve acts, which ensures that the opening end position is reached, for example from a 95% or 98% command value.

The disclosure further relates to an open loop and/or closed loop control method for an electropneumatic field device, as described above, wherein in a normal operating condition of the field device, the manipulating variable is determined by means of a closed loop control algorithm based on the command variable and the actual measurement value of the control member position. In the open loop and/or closed loop control method, a switching action can take place into one of the predetermined operating conditions, particularly the emergency closed loop control condition and/or the emergency open loop control condition. It is possible for an electropneumatic field device equipped with such an open loop and/or closed loop control method to carry out a switching action, from a normal operating condition optionally, for test purposes or in the event of an error condition, in order to carry out a different closed loop or open loop control algorithm instead of the closed loop control algorithm of the normal operating condition.

In an exemplary embodiment of an open loop and/or closed loop control method, the switching action occurs in the event that a non-operational condition, particularly of a sensor for detecting a controlled variable is detected (e.g. the sensor for detecting the actual measurement value of the control member position). The position sensor for detecting the actual measurement value of the control member position is known to be particularly error-prone, as a consequence of the constant movement thereof and the wear associated with that.

In an exemplary embodiment of an open loop and/or closed loop control method, a switching action into another emergency closed loop condition takes place if a non-operational condition of the other controlled-variable than the actual measurement value of the control member position is detected. In the case of such an open loop and/or closed loop control method, after a first switching action, caused in particular by the position sensor, from the normal operating condition into a first predetermined emergency closed loop control condition, a second switching action from the first emergency closed loop control condition into a second emergency closed loop control condition may take place. If, for example after the failure of the position sensor, a switching action is carried out into an emergency closed loop control condition on the basis of an actuating-pressure related measurement value, it is possible in the event of the failure of the actuating-pressure related sensor to carry out a switching action into a different emergency closed loop condition, which can for example control on the basis of an actuating-force related controlled variable. Thus, additional redundancy is created.

In an exemplary embodiment of the open loop and/or closed loop control method, which can be combined with the previous embodiments, a switching action into an emergency open loop control condition can take place, if (additionally) a non-operational condition of one of the other controlled variables than the control member position measurement value is detected, particularly if (additionally) a non-operational condition of a plurality or each of the other controlled variables than the actual measurement value of the control member position is detected. This open loop and/or closed loop control method can therefore change from the normal operating condition to a first emergency closed loop control condition and, if appropriate, to further emergency closed loop operating conditions, and in the event of it not being possible to carry out the emergency closed loop operating condition or conditions, because the underlying controlled variable likewise cannot be detected correctly, is unreliable or the like, change as a further fall-back option to the emergency open loop control condition. The emergency open loop control condition can for example, according to the disclosure, be carried out as described above for the electropneumatic field device. It is also conceivable that after the failure of a closed loop control according to the normal operating condition and the failure of a closed loop control according to the emergency closed loop control condition, an open loop control method, as is described in DE 199 21 828 A1, or a different open loop control method is carried out.

Figure 2:
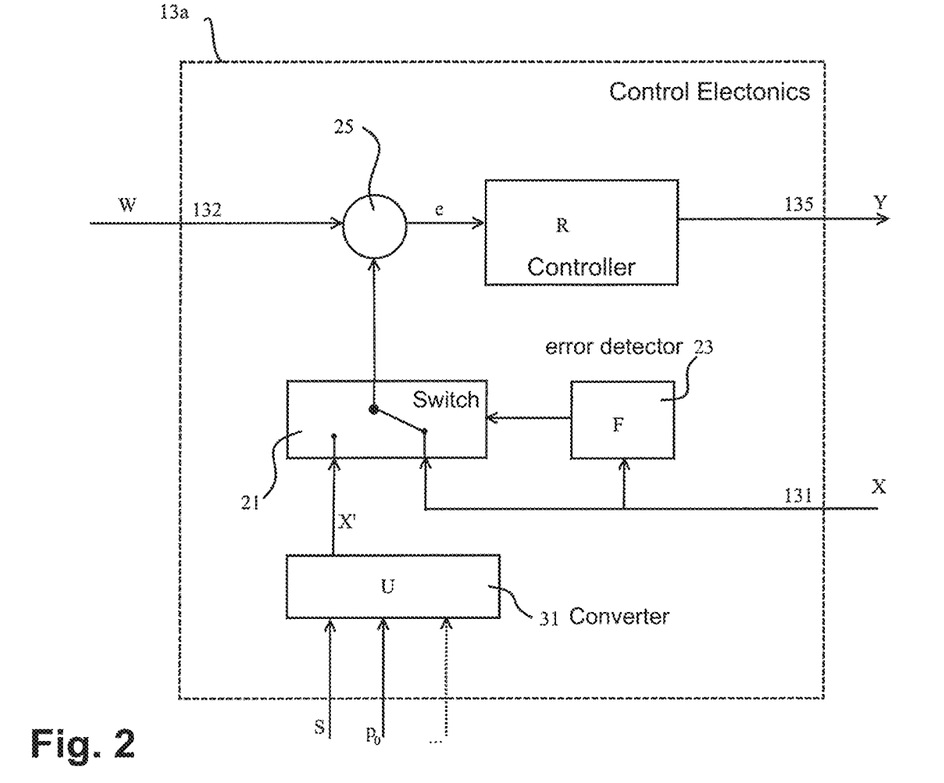
FIG. 2 illustrates open loop and/or closed loop electronics according to an exemplary embodiment of the present disclosure.
Figure 4:
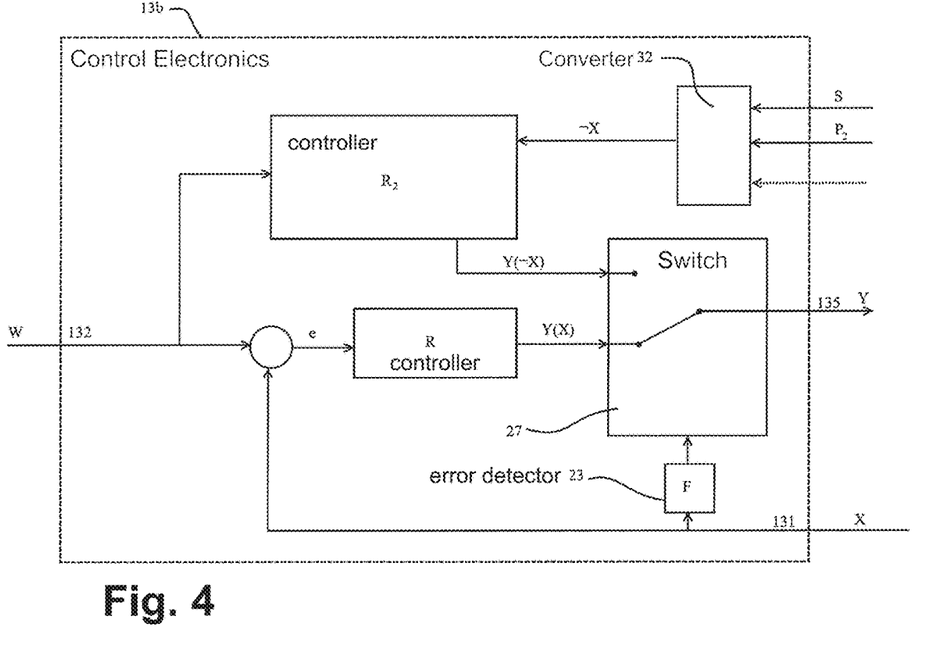
FIG. 4 illustrates open loop and/or closed loop electronics according to an exemplary embodiment of the present disclosure.
Figure 6:
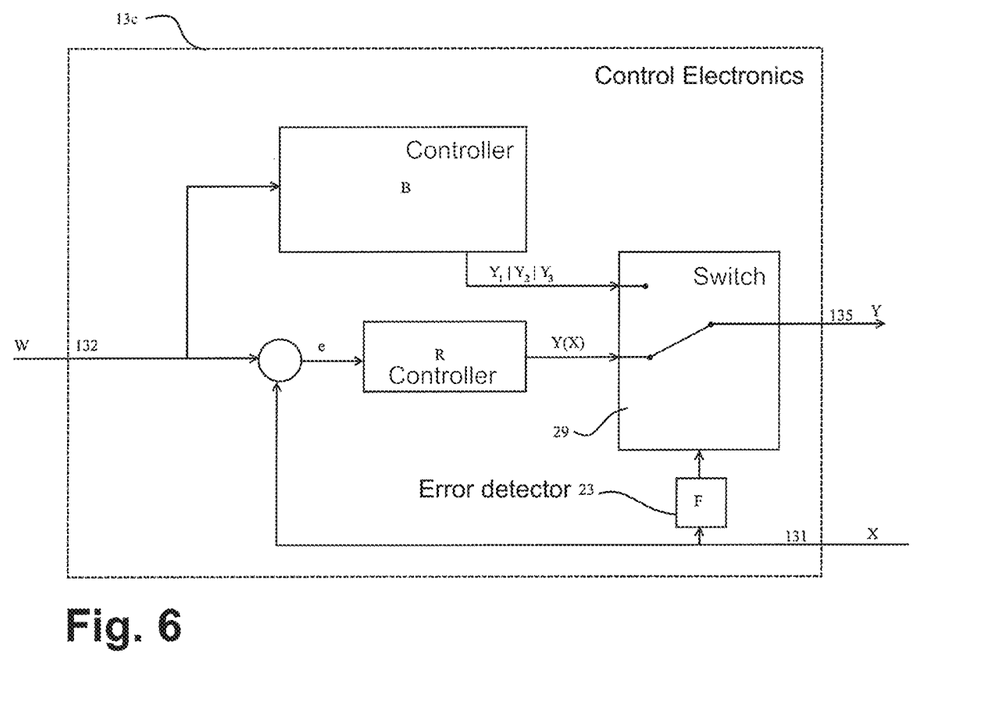
FIG. 6 illustrates open loop and/or closed loop electronics according to an exemplary embodiment of the present disclosure.
Figure 8:
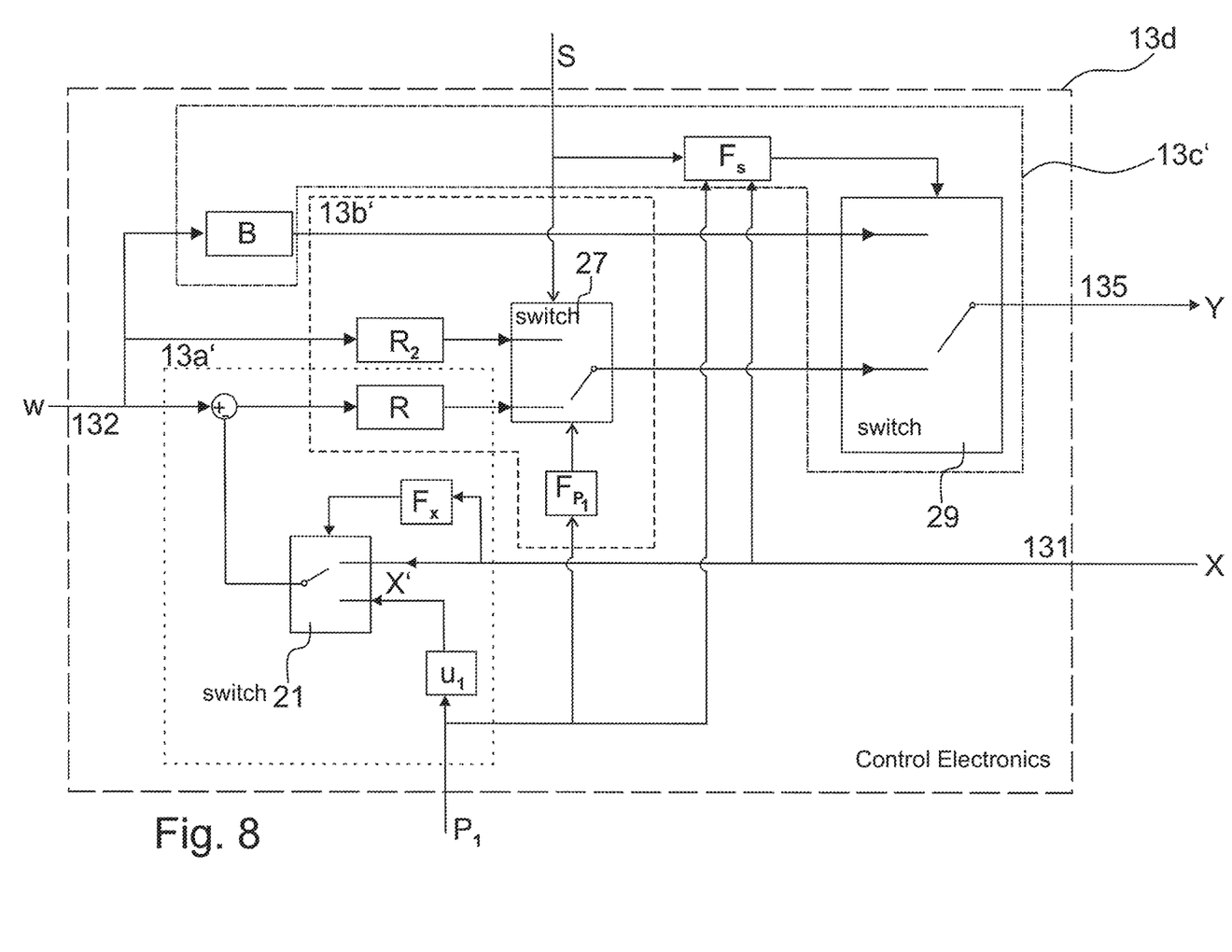
FIG. 8 illustrates open loop and/or closed loop electronics according to an exemplary embodiment, which allow different closed loop controls in either a normal operating condition, a first emergency closed loop condition, a second emergency closed loop condition or an emergency open loop control condition.

In the following description of exemplary embodiments, an electropneumatic field device is generally provided with the reference number 1 and the pneumatic actuating drive thereof is generally provided with the reference number 3. The open loop and/or closed loop control electronics are generally provided with the reference number 13 in the following. For illustration purposes and for easier assignment of the description of the figures to the respective figure, different embodiments of the open loop and/or closed loop electronics 13 may individually be labelled with the reference numbers 13*a*, 13*b*, 13*c* or 13*d*. As illustrated in FIG. 8 two or more embodiments of the open loop and/or closed loop electronics 13 can be combined. For example, open loop and/or closed loop electronics 13*d* includes a combination of two or more open loop and/or closed loop electronic configurations (e.g. 13*a*', 13*b*', 13*c*'). In an exemplary embodiment, as shown in FIG. 8, the three different configurations shown in FIGS. 2, 4 and 6 are combined (e.g. 13*a*'+13*b*'+13*c*'). In an exemplary embodiment, two or more of a same open loop and/or closed loop electronics configuration can be combined. For example, a plurality of identically constructed open loop and/or closed loop electronic configurations can be combined, such as two or more control electronics 13*a*, two or more position regulators 13*b*, or the like. In an exemplary embodiment, the open loop and/or closed loop control electronics 13 (including electronics 13*a*, 13*b*, 13*c*, and 13*d*) includes processor circuitry that is configured to perform one or more operations and/or functions of the open loop and/or closed loop control electronics.

Figure 1:
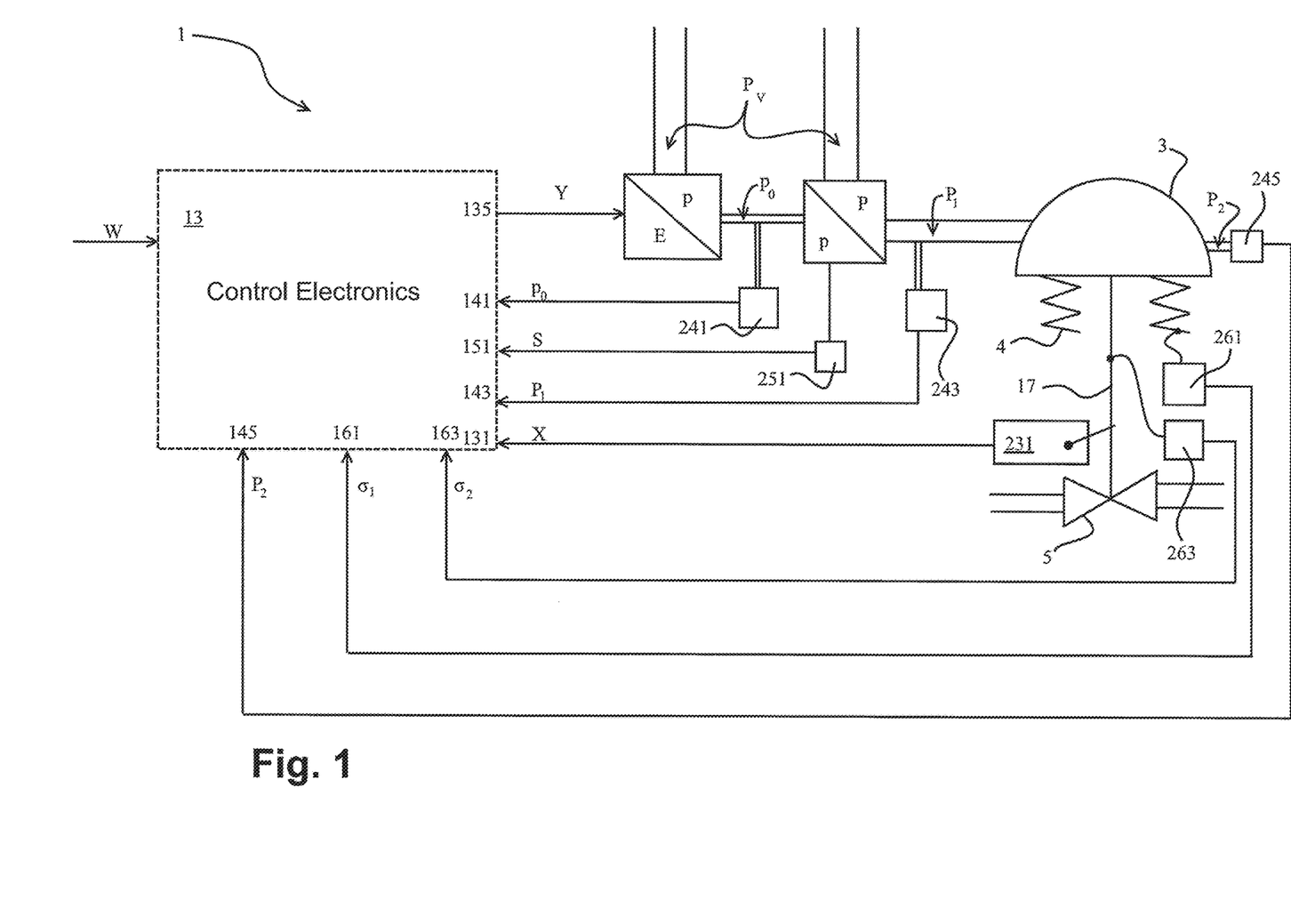
FIG. 1 illustrates an electropneumatic field device according to an exemplary embodiment with open loop and/or closed loop control electronics having an electropneumatic converter and a pneumatic booster to actuate the pneumatic drive, and which has a multiplicity of sensors for detecting measurement values.

FIG. 1 schematically shows an electropneumatic field device 1 with a pneumatic drive 3 for actuating a control valve 5 with the aid of an actuating rod 17, which transmits the actuating force from the actuating drive 3 to the valve member of the control valve 5. The position regulator 1 has position regulator electronics 13 with an input 131 for receiving the actual measurement value of the control member position X from a position sensor 231. The position sensor 231 detects the actual position of the actuating rod 17 or the control member of the control valve 5 and outputs a corresponding actual measurement value of the control member position X to the position regulator electronics 13. Furthermore, the position regulator electronics 13 have a target value input 133 for receiving a command variable W from a superimposed closed loop, for example from a control centre.

The position regulator electronics 13 comprise a control signal output 135 for outputting a manipulating variable Y for piloting an electropneumatic converter 11, which generates a pneumatic actuating or control pressure $p_0$ on the basis of an electrical manipulating variable Y. As depicted in FIG. 1, the I/P converter 11 can output the control pressure $p_0$ to a pneumatic booster 15, which outputs a volume and/or pressure-boosted pressure signal $P_1$ for the pneumatic actuating drive 3 on the basis of the control pressure $p_0$. Typically, both the electropneumatic converter 11 and the volumetric flow booster 15 are supplied by the same supply pressure $P_V$, for example up to 10 bar, and the pneumatic booster 15 boosts the volumetric flow, which is supplied to the actuating drive 3 with essentially the same volume-boosted actuating pressure $P_1$ as the control pressure $p_0$ which the electropneumatic converter 11 outputs. It is clear that an electropneumatic converter 11 can load the pneumatic actuating drive 3 with pressure (not illustrated) directly without interposed volumetric flow booster 15. A volumetric flow booster may be unnecessary for example if the pressure signal $p_0$ provided directly by the electropneumatic converter can provide a satisfactory volumetric flow for a fast actuation of a pneumatic actuating drive 3. Volumetric flow boosters 15 are used for example for large-volume pneumatic actuating drives.

In the normal operating condition, the electropneumatic field device can carry out a closed loop control method, which generates the manipulating variable Y on the basis of the target signal W and the actual measurement value of the position X using a predetermined closed loop control routine. Using the manipulating variable Y, the electropneumatic converter 11 is piloted to generate a control pressure signal $p_0$, in order to cause the actuating drive 3 to run to a certain valve position of the control valve 5. If the measured actual measurement value of the control member position X corresponds to the command variable W, a manipulating variable Y can for example be output, which causes the electropneumatic converter 11 to output an actuating pressure $p_0$, which keeps the actuating pressure $P_2$ in a drive chamber of the actuating drive 3 constant, in order to hold the current position of the control member. If the closed loop control algorithm of the open loop and/or closed loop control electronics 13 detects a deviation between the controlled variable X in the form of the actual measurement value of the control member position and the command variable W, a manipulating variable Y can be generated on the basis of the closed loop control algorithm, which causes the I/P converter 11 to output a control pressure $p_0$, which changes, i.e. increases or decreases, the actuating pressure $P_2$ in the drive 3, in order to move the control member in such a manner that the deviation between the actual measurement value of the control member position X and the target value of the command variable W is reduced.

The field device 1 according to FIG. 1 has numerous sensors, in order to detect actual measurement values or controlled variables in the area of influence of the field device 1. The position sensor 231 for detecting the actual measurement value of the control member position X has already been described above. In a field device, a control pressure sensor 241 can for example be provided at the output of the electropneumatic converter 11, in order to measure the control pressure $p_0$ output by the electropneumatic converter 11. If a pneumatic booster 15 is present, a supply pressure sensor 243 can be provided in the supply line between the booster 15 and the pneumatic drive 3, in order to detect the supply pressure or control pressure $P_2$. An actuating pressure sensor 245 can be provided in or on the actuating drive 3, in order to detect the actuating pressure directly in a pneumatic working chamber of a pneumatic actuating drive 3. The position regulator 13 has inputs 141, 143, 145, in order to receive the respective actual pressure measurement value which is detected by a pressure sensor 241, 243 or 245.

In some pneumatic boosters 15 (for example the pneumatic volumetric flow booster according to the German patent application DE 10 2016 100 919.9 or the European patent application EP 16 183 090.6 of the applicant), the volumetric flow booster contains a plurality of ventilation or bleed valves and, if appropriate, a boosting valve, which can be mounted in a movable manner on its own or together with a plunger. A plunger position can be detected on such a plunger using a position sensor. A plunger position sensor 251 for detecting the plunger position can transmit an actual plunger position measurement signal S to an input 151 of the position regulator electronics 13 provided therefor.

A solenoid valve, for example of type 3967 of the applicant, can for example be used, optionally with a volumetric flow booster, for example of type 3756 of the applicant, as I/P converter. Other I/P converters and/or volume boosters are described in the patents or applications DE 10 2006 006 585 B3, DE 195 05 233 C2 and DE 10 2007 062 207 A1 of the applicant, the entire content of which is included by reference in this application.

Measurement values, which relate directly or indirectly to the actuating pressure, may be termed actuating-pressure-related measurement values or actuating-pressure-related controlled variables. The above-described pressure measurement values $p_0$, $P_1$ and $P_2$ and also the booster plunger position measurement value S realize actuating-pressure related measurement values.

A field device can have sensors for detecting a mechanical stress $\sigma_1$, $\sigma_2$. A tension sensor 261 can for example detect the mechanical stress $\sigma_1$ at a return spring 4 of the pneumatic actuating drive. A stress sensor 263 can detect the mechanical stress $\sigma_2$ at an actuating rod 17 or a mechanical stress at a membrane between pneumatic working chamber and return spring. Instead of a mechanical stress, a mechanical deformation (strain) $\varepsilon_1$ or $\varepsilon_2$ can also be measured. One stress and/or strain sensor 261 can be provided on a return spring 4 and/or a different stress and/or strain sensor can be provided on the actuating rod 17, in order to measure the spring return force or an actuating force. Other force and/or torque measuring cells are also conceivable, in order to detect a restoring force or an actuating force. The actuating-force-related measurement values, for example a mechanical stress $\sigma_1$ or $\sigma_2$ can be transmitted to a respective corresponding input 161, 163 of the position regulator electronics 13.

The field device 1 can be provided via further sensors for detecting process-fluid-related measurement values for example at or in the process fluid stream, upstream and/or downstream of the control valve 5 (not shown). A process-fluid-related measurement value can be detected directly at the control valve, for example a noise development, as a consequence of the opening condition of the control valve, of cavitation noises for example. Process-fluid-related measurement variables can for example be the pressure, the stream velocity and/or the temperature of the process fluid upstream or downstream of the control valve 5.

A central idea of the disclosure is that instead of the measurement variable or controlled-variable X, a closed loop control can also take place using a different measurement or controlled-variable ¬X as the actual control member position measurement value X, particularly in the event of a failure or defect in the position sensor X. By using a different measurement variable, which is often detected anyway using the field device 1, a redundant closed loop control can take place without a redundant position sensor being necessary.

FIG. 2 shows a first embodiment of open loop and/or closed loop electronics 13a for carrying out an open loop and/or closed loop control method according to the disclosure.

The closed loop control electronics 13a have inputs 131, 132 for the actual position measurement value X or the target value W. Furthermore, the electronics 13a have an open loop output 135 for outputting the manipulating variable Y to an electropneumatic converter. Furthermore, the electronics 13a have further inputs for actual measurement values from the environment of the position regulator, particularly for actuating-pressure-specific measurement values, actuating-force-specific measurement values and process-fluid-specific measurement values.

The closed loop control electronics 13a have a controller R for carrying out a closed loop control algorithm on the basis of an input value e. Forming the difference value can be considered as part of the closed loop control algorithm. The input value e is determined, in the illustrated example by means of the difference value creator 25, from the difference between the target value W and the actual position measurement value X or, in the place thereof, the position value X' assigned to the other actual measurement value ¬X.

A switch 21 determines whether the difference value formation of the closed loop control routine R is based on the actual position measurement value X or a position value X' assigned to a different actual measurement value ¬X. The switch 21 receives the actual control member position measurement value X as input variable on the one hand and an assigned position value X' on the other hand. The assigned position value X' is provided by a switch 31, which assigns a corresponding position value from an actual measurement value.

For example, for an assignment in the context of an initialization process of an electropneumatic actuating device (e.g. actuator), the control member can be moved once or multiple times from a completely closed to a completely open position and, during this initialization, a correlation between the actual control member position value and actual measurement values detected simultaneously with respect to an actuating-pressure-related measurement variable, an actuating-force-related measurement variable, a process-fluid-related measurement variable or the like can be determined as assignment. A correlation between any specific desired actual measurement variable and a position value can for example be stored as a characteristic curve or value family in the converter 31. Thus, for example, one actual measurement value of the control pressure $p_0$ for example can be assigned to one corresponding position measurement value according to experience.

If the switch 21 switches from normal operation, in which closed loop control is carried out on the basis of a measured actual control member position measurement value, to an emergency closed loop operation, in which the control valve is actuated on the basis of a different measurement variable X, which then functions as controlled-variable, an assigned position measurement value X', which is provided by the switch 21 instead of the actual position measurement value X to the controller R, can be output on the basis of the correlation stored in the converter 31 by means of a different measurement value X. In this example according to FIG. 2, the controller R controls both the normal operating condition and the emergency closed loop operating condition in an identical manner, wherein the controller always treats the provided controlled-variable X or X' as an actual control member position measurement value X. The pneumatic field device or the open loop control and/or closed loop control electronics 13a thereof can thus carry out the same closed loop control algorithm both in the normal operating condition and in the emergency closed loop control condition.

The actuation of the switch 21 takes place as a reaction to the case of a switching signal u. The switching signal u can for example be triggered by an error detector 23, which monitors the actual control member position measurement value X and checks the same for plausibility. If the error detector 23 determines, on the basis of an error detection algorithm, that an actual position measurement value X is defective or not plausible, for example because it exceeds the physically possible upper limit of a position value, or falls below a physically possible lower limit of a position value, the error detector 23 can output the switching signal, in order to actuate the switch 21 such that the actual control member position measurement value X is no longer transmitted to the controller R but rather a different controlled variable ¬X is transmitted to the controller R.

The assignment of a controlled if variable or an actual measurement value, for example an actuating-pressure related actual measurement value, an actuating-force related actual measurement value, a process-fluid-related actual measurement value or the like to a corresponding position measurement value X' can, as shown in FIG. 2, take place such that the correlated or simulated position measurement value X' is predetermined as input value of the switch 21. It is also conceivable that the switch 21 receives an unfiltered or uncorrelated actual measurement value as input value and the conversion only takes place following the switch. For this purpose, it is possible to provide an apparatus (not illustrated) for signal conversion (e.g. a converter) between the controller R or the difference value creator 25 and the switch 21, which apparatus for signal conversion can for example likewise be activable by means of the switching signal u.

Furthermore, it is conceivable that a converter 31 outputs an assigned position value X' for further processing by the controller R, which is for example based on a value matrix of a predetermined pairing of two actual measurement values, for example an actuating-pressure-related measurement value and a process-fluid-related measurement value.

Figure 3:
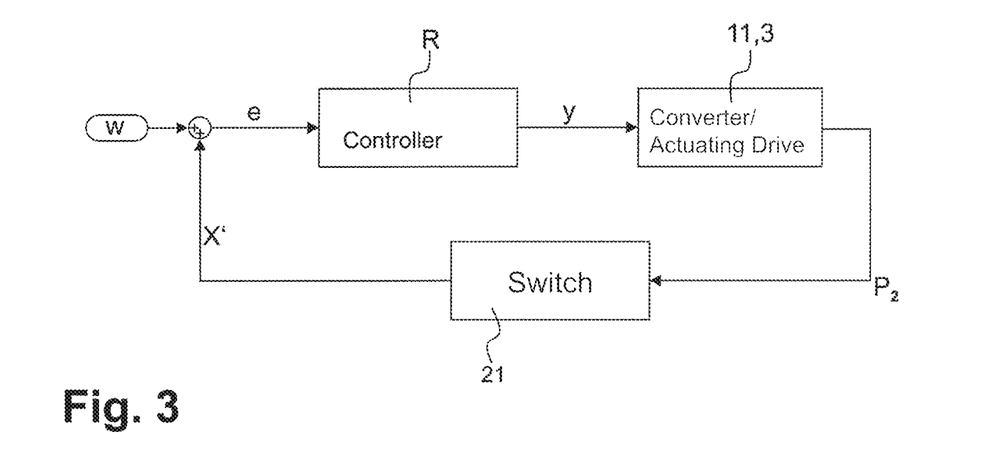
FIG. 3 illustrates to a closed loop control method according to an exemplary embodiment of the present disclosure.

FIG. 3 shows a closed loop path for a closed loop control method according to an emergency closed loop control condition, which can be realized for example using the open loop and/or closed loop control electronics 13a according to FIG. 2. The closed loop path receives a target value corresponding to the command variable W for comparison with the assigned position value X', on the basis of which a controller R executes a closed loop control algorithm, concerning the manipulating variable Y for the control path, which consists of an electropneumatic converter, if appropriate a booster, a pneumatic drive and a control member. A pressure measurement value, for example the actuating pressure $P_2$ in the actuating drive 3, is tapped from this path and converted by means of the converter 21, for example on the basis of a conversion function U, into a position value X' assigned to the actual actuating pressure ($P_2$) measurement value. It shall be clear that instead of the actuating pressure $P_2$ in the working chamber of the actuating drive 3, a different controlled variable ¬X may alternatively be used.

FIG. 4 shows an alternative embodiment of open loop and/or closed loop control electronics 13b according to the disclosure for carrying out an open loop and/or closed loop control method according to the disclosure. The essential difference of the electronics 13b compared to the above-described electronics 13a is that the switch 27 in the electronics according to FIG. 4 on the one hand receives a manipulating variable Y (X) based on the actual control member position measurement value X, and on the other hand receives a manipulating variable Y (¬X) determined on the basis of a different measurement variable ¬X.

In the normal operating condition, the closed loop control can take place at the closed loop control electronics 13b on the basis of the measured actual position measurement values X and the target value W provided by the command variable via a position closed loop control algorithm R. In the normal operating condition, the manipulating variable Y (X) determined by the position closed loop control algorithm R is transmitted by means of the passive switch 27 to the manipulating variable output 135 of the electronics 13b and from there forwarded to the electropneumatic converter.

At the closed loop control electronics 13b according to FIG. 4, a different type of emergency closed loop control condition is activated than in the above-described control electronics 13a. The closed loop control electronics 13b according to FIG. 4 has a closed loop routine $R_2$ configured to carry out a specific emergency closed loop control routine on the basis of the controlled variable X different from the actual control member position measurement value X. This different controlled variable can for example be an actual measurement value from any one of the other sensors described in FIG. 1, for example an actuating-pressure related measurement variable ($p_0$, $P_1$, $P_2$, S or the like), an actuating-force-related measurement variable, a process-fluid-related measurement variable or the like.

The position regulator electronics 13b may comprise a converter 32 similar to the above-described converter 31, but does not need to carry out a conversion, rather can even deliver the other measurement value ¬X directly to the second controller $R_2$ for carrying out the specific measurement-variable-dependent closed loop control routine.

The closed loop controller $R_2$ can generate a value for a manipulating variable Y (¬X) directly on the basis of the command variable target value W and a different controlled variable ¬X from the actual control member position measurement value X, and output this value for piloting the electropneumatic converter. In the emergency closed loop condition, the switch 27 receives a switching signal u, for example from an error detector 23, which causes the switch 27 to output the manipulating variable Y (¬X) as manipulating variable Y at the control output 135 for the electropneumatic converter, in accordance with emergency closed loop control operation.

Figure 5A:
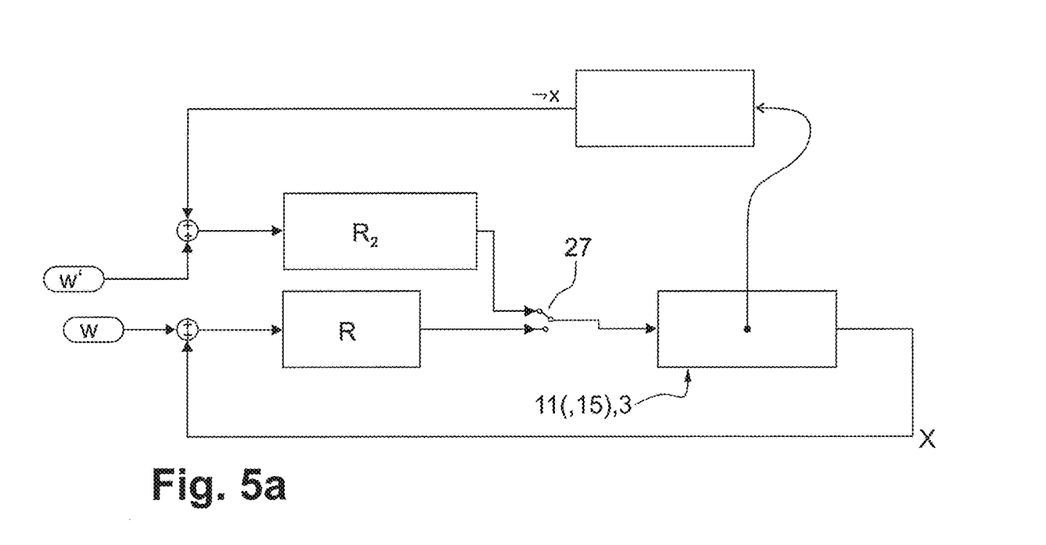
FIG. 5a illustrates a closed loop control method according to an exemplary embodiment of the present disclosure.

A schematic closed loop for a closed loop control method with switching between a normal operating condition and an emergency closed loop control condition, as described with regards to FIG. 4, is illustrated in FIG. 5a. During normal operation, the closed loop control takes place according to a closed loop control routine of a first controller $R_1$ on the basis of the command variable W and the control member position measurement value X. During emergency closed loop operation, a specific error condition target value can be predetermined as command variable W', in the event that the use of a specific error condition command variable W' is provided. Alternatively, the command variable W provided as standard can also easily be used as error condition command variable W' by the superordinate controller circuit or the control centre. The error condition command variable W' and the controlled variable ¬X differing from the actual control member position measurement value X are input in the closed loop control routines of a different closed loop controller $R_2$, in order to determine the manipulating variable on the basis of the different controlled variable ¬X and the command variable W'. One of the two manipulating variables can be input by means of the switch 27 into the closed loop path, which comprises the electropneumatic converter, if appropriate, a pneumatic booster, the pneumatic drive, and the control member. The control path can be based on any desired manipulating variable, for example an actuating-pressure-specific controlled-variable, an actuating-force specific controlled-variable or a process-fluid related controlled variable, which is detected by means of a corresponding sensor, as an actual-control-member-position-measurement-unrelated controlled variable ¬X for closed loop control in an emergency closed loop control condition.

Figure 5B:
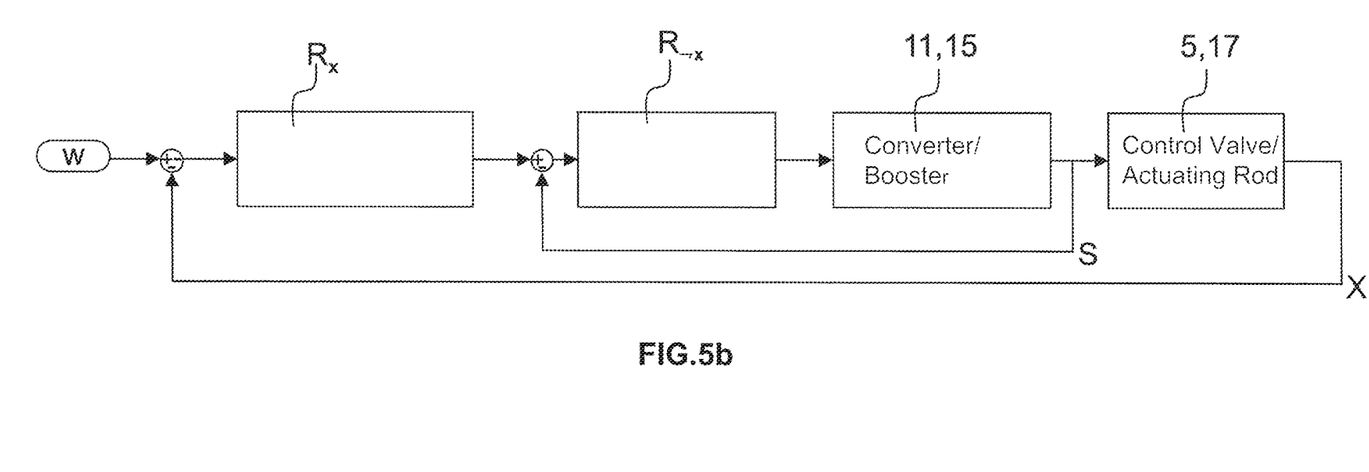
FIG. 5b illustrates a closed loop control method in a normal operating condition according to an exemplary embodiment of the present disclosure.
Figure 5C:
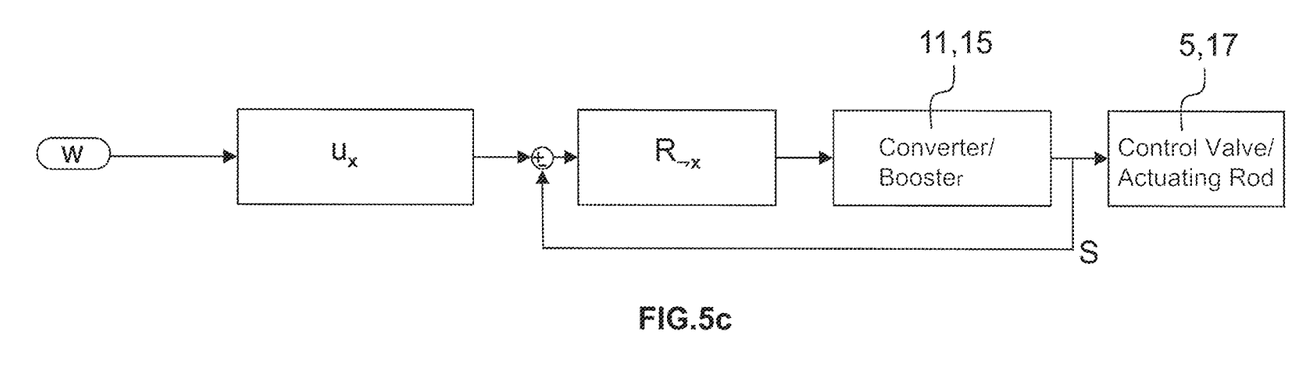
FIG. 5c illustrates the closed loop control method shown according to the aspects shown in FIG. 5b in an emergency closed loop control condition.

FIGS. 5b and 5c show the closed loop path in a simplified illustration similarly to FIG. 5a for a normal operating condition (FIG. 5b) and an emergency closed loop control condition (FIG. 5c). During the normal operating condition, the closed loop path according to FIG. 5b actuates the actuating drive on the basis of the measured actual position value of the control member and the target position value W from a control centre (not illustrated). In this closed loop path, an electropneumatic converter is used with a volumetric flow booster, wherein the volumetric flow booster is equipped with a plunger position sensor, which detects a plunger position of a valve of the volumetric flow booster and can return the same to open loop and/or closed loop electronics.

If the measurement of the actual control member position X fails or the sensor clearly delivers unreliable values, it is possible to switch to the emergency closed loop condition according to FIG. 5c, in which an indirect closed loop control takes place on the basis of the measured booster plunger position S. The emergency closed loop control according to FIG. 5c can be based on a command signal W, which is converted in the emergency closed loop control condition by a conversion routine $U_X$ into an emergency command signal W', which together with the actual booster plunger position measurement value S is used as a basis for the closed loop control routine R¬x.

FIG. 6 shows open loop and/or closed loop control electronics 13c, in which the switching takes place using the switch 29* similar to that of the closed loop control electronics 13b on the output side upstream of the control output 135. Similarly to the above, the switch can change from a normal operating condition to an emergency operating condition, which is realized in FIG. 6 as an emergency open loop control condition, as a consequence of an error detector 23. The closed loop control during normal operation takes place in the electronics 13c according to FIG. 6 exactly as in the electronics 13b, which are described above with regards to FIG. 4. In the emergency open loop condition, an open loop control can take place solely on the basis of the command signal W supplied to the target value input of the electronics 13c.

In an open loop control method according to the disclosure, the manipulating variable is determined by the open loop controller B on the basis of the command variable W and a predetermined reference variable. The reference variable can for example relate to a permitted command variable range, for example 4 . . . 20 mA, and may in particular be an average permitted command variable reference value, for example 12 mA. If the command variable W applied at the target input 132 is smaller than the reference variable, the open loop control can output a manipulating variable $Y_1$; which causes the electropneumatic converter to vent the pneumatic actuating drive for example. If the command variable W is greater than the reference value, the open loop control algorithm of the open loop controller B can output a manipulating variable $Y_2$, which causes the electropneumatic converter to increase the pressure in the pneumatic actuating drive. If the command variable W is identical to the reference value or at least lies inside a tolerance range around a reference variable, then the open loop control routine of the open loop controller B can output a manipulating variable $Y_3$ which causes the electropneumatic converter to load the actuating drive with a moderate actuating pressure or to maintain the current actuating pressure.

Figure 7:
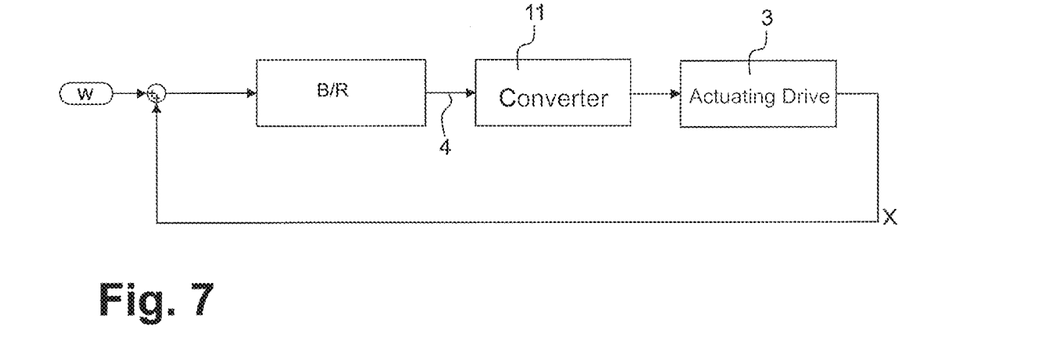
FIG. 7 illustrates an open loop and/or closed loop control according to an exemplary embodiment of the present disclosure.

The closed loop illustrated in FIG. 7 has a closed loop method, which can be executed in a normal operating condition by the electronics 13c according to FIG. 6 for example. Accordingly, a target signal W is applied at the input, which together with the measured actual control member position measurement value X can be used as the basis of a closed loop control with the controller R, in order to actuate a manipulating variable signal Y for an electropneumatic converter. The converter specifies an actuating pressure, in order to actuate the pneumatic actuating drive 3, which manipulates the control member. In the event of a failure of the position sensor, which, in intact condition, outputs the actual control member position measurement value X, it is possible to switch to an open loop control on the basis of the target value W with the aid of an open loop control routine of an open loop block B.

FIG. 8 shows an exemplary embodiment of open loop and/or closed loop electronics, in which a plurality of switchable closed loop controls are connected in series in a cascade-like manner. As illustrated schematically by the dashed groupings, the open loop and/or closed loop control electronics 13d include a plurality of control electronics 13a', 13b' and 13c', which correspond to the above-described open loop and/or closed loop controllers 13a or 13b or 13c.

A first switching group 13a' allows switching, similarly to the closed loop control electronics 13a according to FIG. 2, between a closed loop control, which is based on an actual control member position measurement value X, and a closed loop control based on a different measurement variable, here: the actual pressure measurement variable indicated by way of example with the actual control pressure $P_1$, which can be measured between the volumetric flow booster 15 and the working chamber of the pneumatic drive 4. Independently of the actual measurement variable X or $P_1$, the same controller R is used with the same closed loop control routine for generating a manipulating variable signal Y. In this case a conversion takes place, starting from the actually measured actual pressure measurement value $P_1$ at a volumetric flow booster output, with the aid of a converter $U_1$, into an assigned position measurement variable X'. In the normal operating condition, the switch 21 forwards the actual position measurement variable X and, when a defective position measurement is detected by the error detector $F_X$, forwards the assigned position variable X' to the controller R.

The second switch 13b' essentially operates the above-described closed loop control electronics 13b, in that either a manipulating variable signal generated by a first closed loop control algorithm or a manipulating variable signal generated by a different closed loop control algorithm is forwarded by the second switch 27 in the direction of the control output 135. In the example depicted in FIG. 8, the switching from the first closed loop control algorithm R to the other closed loop control algorithm $R_2$ takes place if an error detector $F_{P1}$ detects defective behaviour both of the actual position measurement value X and of the actual actuating pressure measurement value $P_1$. The switching then switches to a different emergency closed loop control condition, in which a closed loop control is undertaken with the closed loop controller $R_2$ on the basis of a closed loop control algorithm, which is based on the command variable W and an in turn different controlled variable, which in the example depicted in FIG. 8 is specified by way of example as the booster valve plunger position S.

The closed loop control electronics 13d further comprise a third switch 13c', which essentially corresponds to the open loop and/or closed loop electronics 13c according to FIG. 6, wherein a switch between a closed loop control condition, which in FIG. 8 is already an emergency closed loop control condition, and an emergency open loop control condition can take place. The switching takes place with the aid of the switch 29, if a defective behaviour both of the actual position measurement variable X of the control member, of the actual actuating pressure measurement value $P_1$ and of the booster plunger position measurement value S is detected by an error detector FS.

The apparatuses or components illustrated as individual components in FIGS. 2, 4, 6 and 8 can be realized as individual electrical circuits (e.g. analogue circuits) and/or individual processors (e.g. processor circuitry). It is likewise conceivable that the electronic components or apparatuses in the open loop and/or closed loop control electronics 13, 13a, 13b, 13c or 13d can be realized in a partially or completely integrated manner, for example in a microcontroller, a microprocessor or other processor circuitry. The controllers $R_1$ and $R_2$ can be realized by the same microprocessor which can use different closed loop control routines configured to calculate a manipulating variable.

The features disclosed in the above description, the figures, and the claims can be of significance individually as well as in any combination for the realisation of the disclosure in its various embodiments.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 Field device
3 Actuating drive
4 Return spring
5 Control valve
11 Converter
13, 13a, 13b, 13c, 13d Open loop and/or closed loop control electronics
15 Booster
17 Actuating rod
21, 27 Switch
23 Error detector
25 Difference value creator
29 Switch
31, 32 Converter
131, 132, 141, 143, 145, 151 Input
133 Target value input
135 Control signal output
231 Position sensor
241, 243, 245 Pressure sensor
251 Plunger position sensor
261, 263 Stress and/or strain sensor
B Control component
p0, P1, P2 Control pressure
PV Supply pressure
R, R1, R2 Closed loop controllers
S Plunger position
UX Conversion routine
W, W' Command variable
X ACTUAL position measurement value
¬X Different controlled variable
X' Assigned position measurement value
Y, Y1, Y2, Y3 Manipulating variable
ε1, ε2 Deformation
σ1, σ2 Stress

The invention claimed is:

1. A closed loop control method for an electropneumatic field device including a pneumatic actuating drive configured to operate a control member, an electropneumatic converter configured to generate a pneumatic manipulating variable signal for the pneumatic actuating drive, and open loop and/or closed loop control electronics, the method comprising:

receiving, by the open loop and/or closed loop control electronics, an electronic target value input of a command variable corresponding to a target value of a control center;
generating, by the open loop and/or closed loop control electronics, an electronic output for a manipulating variable to pilot the electropneumatic converter; and
in a predetermined operating condition of the field device, determining the manipulating variable by a closed loop control algorithm based on the command variable and on another controlled variable different from an actual control member position measurement value, wherein the predetermined operating condition is an emergency closed loop control operating condition.

2. The closed loop control method according to claim 1, wherein, in the predetermined operating condition, the manipulating variable is determined by the closed loop control algorithm based on the command variable, and based on a controlled variable related to an actuating pressure, a position measurement value regarding a position of a plunger of a pneumatic booster, and/or a controlled variable related to an actuating force of an actuator rod or actuator shaft of the pneumatic actuating drive.

3. The closed loop control method according to claim 1, wherein, in the predetermined operating condition, the manipulating variable is determined by the closed loop control algorithm based on the command variable and based on a controlled value at the control member and related to a process fluid.

4. The closed loop control method according to claim 1, wherein a series of predetermined controlled value measurement values is associated with a respective control member position measurement value, and wherein, in the predetermined operating condition, dependent on an actual controlled member measurement value, the respective associated control member position measurement value is provided to the closed loop control algorithm in place of the control member position measurement value, the closed loop control algorithm being configured to determine the manipulating variable based on the command variable and on the actual control member position measurement value.

5. The closed loop control method according to claim 4, wherein the series of predetermined controlled variable measurement value is associated with a respective control member position measurement value as a characteristic curve.

6. The closed loop control method according to claim 4, wherein the association of the respective control member position measurement value to the series of predetermined control member measurement values is repeatedly updated in an initialization process of the field device and/or during the operation of the field device after a predetermined time interval, and wherein a mean association value formation is conducted with a repeated association.

7. The closed loop control method according to claim 1, wherein a measurement value of a plunger of a pneumatic booster is used as the other controlled variable, and wherein:
the manipulating variable is set such that the plunger of the pneumatic booster moves toward a direction of 0% opening when the command variable is smaller than a predefined reference value;
the manipulating variable is set such that the plunger of the pneumatic booster moves in a direction of 100% opening when the command variable is larger than the reference value; and the manipulating variable is set such that the plunger of the pneumatic booster stands still when the command variable corresponds to the reference value.

8. An open loop control method for an electropneumatic field device including a pneumatic actuating drive configured to operate a control member, an electropneumatic converter configured to generate a pneumatic manipulating variable signal for the pneumatic actuating drive, and open loop and/or closed loop control electronics, the method comprising:
receiving, by the open loop and/or closed loop control electronics, an electronic target value input for a command variable corresponding to a target value of a control center;
generating, by the open loop and/or closed loop control electronics, an electronic output for a manipulating variable to pilot the electropneumatic converter;
in a predetermined operating condition of the field device, determining the manipulating variable by an open loop control algorithm based on the command variable and on a predetermined reference value, wherein the predetermined operating condition is an emergency open loop control operating condition; and
dependent upon a comparison of the command variable to the reference value, attributing one of a plurality of predetermined manipulating variable values to the manipulating variable.

9. The open loop control method according to claim 8, wherein, in the predetermined operating condition:
a first predetermined manipulating variable value is attributed to the manipulating variable when the command variable is smaller than the reference value;
a second predetermined manipulating variable value is attributed to the manipulating variable when the command variable is larger than the reference value; and
a third predetermined manipulating variable value is attributed to the manipulating variable when the command variable corresponds to the reference value.

10. The open loop control method according to claim 8, wherein:
a first predetermined manipulating variable value is predetermined such that the first manipulating variable value causes an electropneumatic converter to reduce the output pressure;
a second predetermined manipulating variable value is predetermined such that the second manipulating variable value causes the electropneumatic converter to increase the output pressure; and
a third predetermined manipulating variable value is predetermined such that the third manipulating variable value causes the electropneumatic converter to set a predetermined mean output pressure.

11. The open loop and/or closed loop control method for an electropneumatic field device according to claim 8, wherein, in a normal operating condition of the field device, the manipulating variable is determined by a closed loop control algorithm based on the command value and on an actual measurement value of the control member position, and wherein a switching action into an emergency closed loop control operating condition or the emergency open loop control operating condition as the predetermined operating condition is performed.

12. The open loop and/or closed loop control method according to claim 11, wherein the switching action occurs when a non-operational condition is detected.

13. The open loop and/or closed loop control method according to claim 11, wherein the switching action into the emergency closed loop control condition is performed when a non-operational operating condition of a sensor configured to detect a controlled variable other than an actual measurement value of the control member position is detected.

14. The open loop and/or closed loop control method according to claim 11, wherein the switching action into the emergency open loop control operating condition occurs when a non-operational condition of the other controlled variable different from the actual measurement value of the control member position is detected.

15. The closed loop control method according to claim 1, wherein, in the predetermined operating condition, the manipulating variable is determined by the closed loop control algorithm based on the command variable, and based on a controlled variable related to an actuating pressure, a position measurement value regarding a position of a plunger of a pneumatic booster, and a controlled variable related to an actuating force of an actuator rod or actuator shaft of the pneumatic actuating drive.

16. The closed loop control method according to claim 1, wherein the emergency closed loop control operating condition is in response to a non-operational operating condition of a sensor configured to detect the actual control member position measurement value.

* * * * *